(Model.)
J. W. SOHN, C. O. RICHTER & R. S. CARR.
SEEDING MACHINE.
No. 257,622. Patented May 9, 1882.
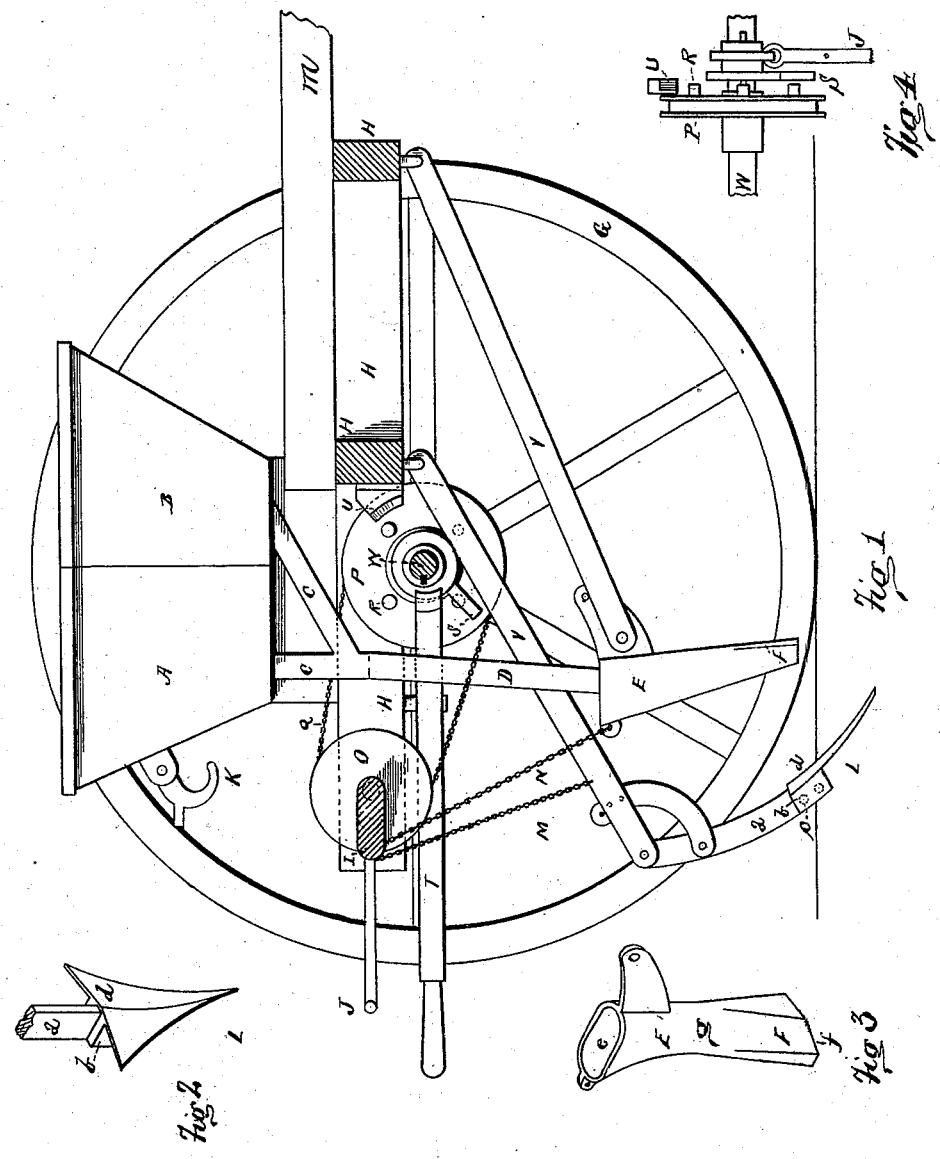
WITNESSES:
Jno. R. Woods
John Sorenz
INVENTORS
John W. Sohn
Charles O. Richter
Robert S. Carr
by James W. See ATTORNEY

UNITED STATES PATENT OFFICE.

JOHN W. SOHN, CHARLES O. RICHTER, AND ROBERT S. CARR, OF HAMILTON, OHIO; SAID RICHTER AND CARR ASSIGNORS TO SAID SOHN.

SEEDING-MACHINE.

SPECIFICATION forming part of Letters Patent No. 257,622, dated May 9, 1882.

Application filed August 30, 1881. (Model.)

*To all whom it may concern:*

Be it known that we, JOHN W. SOHN, CHARLES O. RICHTER, and ROBERT S. CARR, of Hamilton, Butler county, Ohio, have invented certain new and useful Improvements in Seeding-Machines, of which the following is a specification, reference being had to the accompanying drawings, in which—

Figure 1 is a side view, partly in section, of our improved seeder; Fig. 2, a perspective view of one of the shovels; Fig. 3, a perspective view of one of the seed-tubes, and Fig. 4 a plan of lifting mechanism.

This invention pertains to improvements on the seeding-machine patented June 22, 1875, by Jos. R. Symmes, the patent being numbered 164,781, and reference should be had to said patent in connection with this specification. Where no detailed description of parts is herein made such parts are to be considered as being constructed in accordance with said patent or in accordance with custom.

In Fig. 1, H is the framing, G the wheel, W the axle, *m* the tongue, B the seed-box, A the fertilizer-box, D the dropping-hose, C C the conduits thereto from the boxes, E the distributers, L the shovels, V the drag-bars, I the winch-bar, M N the lifting-chains, J the winch-lever, and K the winch-lever hook, of a seeding-machine.

Fertilizer and seed both pass through the distributers E. These distributers are hollow castings attached to their drag-bars. They have a broad bottom and beveled front. They are supported close to the ground, but do not touch the soil, except in case they strike clods, which it is their function to remove sidewise. They drop the seed and fertilizer upon the level surface of the soil, which is to have been previously pulverized and prepared. The shovels L follow behind and between the distributers and cover the seed-bed with soil removed from between the seed-beds, thus producing alternate ridges and furrows with a level broad seed-bed containing seed and fertilizer across the ridge below its upper surface. The shovels L are triangular, with a bevel crowned face, as shown in Fig. 2, the side edges being straight and the angle acute. The curvature of the shovels is vertical only, as shown in Fig. 1, all other contour-lines being straight ones. This form of shovel possesses maximum efficiency as a covering-shovel when set well in the soil, and when set lightly in the soil its acute point forms a most perfect cultivator-tooth for the after-treatment of the ridged crop. The shovels L are of chilled cast-iron, and have thin rear jaws, *b*, which clasp the side of the shank *a*. The shovels are cast on the shanks, and holes *c*, previously cut in the shank, permit metal to join the two flanges and rigidly dowel the shovels to the shanks. The rear surface of the shank, not being covered by the cast-iron, is exposed, and tends to remain cool during the process of casting, and thus insure a lesser shrinkage of the shank. This secures a rigid union of the parts.

The winch-bar I serves, as usual, to lift the shovels by means of chains M. The distributers E are lifted by chains N. The chains N are attached to the winch-bar at a point nearer its axis than are the chains M, and the distributers are thus lifted a lesser distance. As the distributers are set much higher than the shovels they need but a slight lift, and the power to lift is thus reduced.

In addition to the hand-lift, a device is provided for automatically lifting the dragging parts.

The pulley O is fast on the winch-bar I. The pulley P is loose on the axle W. The chain Q transmits motion between these two pulleys. The pulley P has clutches R upon its face.

S is a clutch splined upon the axle W, and arranged to be thrown into gear by the lever T.

U is an incline, fixed to the frame of the machine, which at a certain point obstructs the rotation of the clutch S and throws said clutch out of gear with the pulley P. At the unclutching-point the winch-bar is at its extreme upward position and the drag-work is lifted. When the clutch uncouples, the hook K catches the lever J and sustains the parts. The drag-work is lowered by hand, as usual, and when down is ready at all times to be lifted by power by the simple manipulation of the lever T.

As the pulleys O and P make but partial revolution, it is obvious that they may be segmental, and that a single chain fastened to the periphery of each segment will serve instead of the belt-like chain shown in the drawings.

The clutch-work may be applied at the axis of the winch-bar, its pulley being the loose one in such case, without departing from the spirit of this invention. Other forms of clutches and disengaging devices may also be employed.

We claim as our invention—

1. In a seed-drill of the class specified, the distributing-tubes E, having a broadened and flattened issue end, F, with beveled front surfaces, substantially as shown and described.

2. The combination of distributers having broadened ends arranged to scrape the surface of the soil, seed-conduits and fertilizer-conduits, both set to issue into said distributers, and covering-shovels arranged behind and between said distributers to produce unfertilized trenches between the seed-rows, substantially as shown and described.

3. In a seed-drill of the class specified, the combination, with seed-distributing tubes having broadened, flattened, and beveled issue end, of following covering-shovels in the form of an acute triangle with straight side edges and beveled crowning faces, substantially as set forth.

4. The combination, with a shovel-shank having its end perforated, of a shovel cast thereon and having rear flanges clasping said shank and united by the metal in said perforations, substantially as set forth.

5. The combination of shovel-shank a with shovel L, cast thereon, having flanges b in contact with the shank, the shovel and flanges contacting with three sides only of the shank, substantially as and for the purpose set forth.

6. The combination, with a deep-set seeder-shovel, a highly-set seed-distributer, an elevating winch-bar of flattened section, and a chain from said shovel to said winch, of a chain from said distributer attached to said winch-bar at a point nearer its axis than the point of attachment of said shovel-chain, substantially as set forth.

7. The combination of a main axle, a winch-bar parallel thereto, a series of drag-bars suspended from the winch-bar and arranged to be lifted by the rotation of the same, a means for transmitting rotary motion from the axle to the winch-bar, a sliding clutch and fixed incline or equivalent device for arresting such transmission, a lever projecting from the winch-bar, a hook to engage said lever and retain it when motion is arrested, and a lever for starting the transmission, substantially as set forth.

8. The combination, with a seeder-axle, a rotary winch-bar, a winch-bar lever, and its retaining-hook, of a tight pulley, a loose pulley, a means of transmission between them, a sliding clutch adapted to engage with said loose pulley, a hand-lever to slide said clutch, and a fixed incline to release said clutch, substantially as set forth.

JOHN WM. SOHN.
CHARLES O. RICHTER.
ROBERT S. CARR.

Witnesses:
J. W. SEE,
NELSON WILLIAMS.